(12) United States Patent
Pearson

(10) Patent No.: US 8,673,150 B2
(45) Date of Patent: Mar. 18, 2014

(54) METHOD FOR REDUCING ORGANIC WASTE IN WASTE WATER

(76) Inventor: George John Joseph Pearson, Mountville, PA (US)

( * ) Notice: Subject to any disclaimer, the term of this patent is extended or adjusted under 35 U.S.C. 154(b) by 393 days.

(21) Appl. No.: 13/118,705

(22) Filed: May 31, 2011

(65) Prior Publication Data
US 2012/0305475 A1    Dec. 6, 2012

(51) Int. Cl.
*C02F 3/00*        (2006.01)
(52) U.S. Cl.
USPC ............................. 210/606; 210/610; 210/611
(58) Field of Classification Search
USPC .......................................... 210/606, 610, 611
See application file for complete search history.

(56) References Cited

U.S. PATENT DOCUMENTS 3,396,034 A * 8/1968 Blondheim et al. ........... 426/584
5,770,079 A * 6/1998 Haase ............................ 210/606

* cited by examiner

*Primary Examiner* — Chester Barry
(74) *Attorney, Agent, or Firm* — Steven L. O'Donnell

(57) ABSTRACT

A method of treating waste water is disclosed which comprises placing a porous container such as a mesh bag containing a gelatinous culture of vegetative bacteria into waste water. The gelatinous culture dissolves over time and releases the bacteria contained therein. In some embodiments, the porous container may be reclaimed at any time. Treatment with the method eliminates a substantial portion of organic waste found in waste water and reduces or eliminates the need for used to eliminate organic waste build up in waste water facilities.

2 Claims, 2 Drawing Sheets

METHOD FOR REDUCING ORGANIC WASTE IN WASTE WATER

FIELD OF THE INVENTION

The subject matter of this application relates to methods of reducing waste, particularly fats, oils and grease (FOG) and that waste which increases biochemical oxygen demand (BOD) (collectively "organic waste") in collection systems such as sewer lines, lift stations, treatment plants and similar such effluent transfer and storage facilities (collectively "effluent facilities").

BACKGROUND

Many types of waste are poured down drains. Fats, oils, and grease ("FOG") are common such wastes that are present in meats, cooking and salad oils, cooking grease, lard, butter, margarine and multitude of other foodstuffs. Additionally, FOG may also refer to non-edible fats, oils, and greases.

FOG, in particular, poses a problem for sewer systems because fats, oils, and greases are largely insoluble in water and will accumulate over time in drainage pipes, as well as further down the sewer path. These accumulations may not only primarily restrict waste water flow thought the pipe, but can also secondarily restrict water flow by providing a substrate where solid waste can stick. These restrictions may build to the point where the pipe is sufficiently blocked so that waste water will back up into homes and businesses causing expensive damage and requiring further corrective actions to increase the flow of waste water. Since most buildings have a single common sewer pipe for all waste water, the results of a backup of water can be much more unpleasant than the backing up of only water from a sink.

Home and restaurant kitchens, as well as catering and institutional food services can spend thousands of dollars to repair the damage caused by the buildup of FOG. The sequela of a clogged drain can cause a home to be temporarily inhabitable and force a business to close until the sewer drain is cleared and the damage is cleaned and repaired. The advantages to keeping drains free of any build up before a blockage occurs are clear, however the most common preventative measures often include the use of corrosive chemicals that are dangerous to handle and store, and which are not environmentally sound.

The problems with FOG waste are not limited to individual buildings, municipalities also have to contend with the build up of FOG in shared sanitary sewer lines as well as in treatment plants and any other effluent transfer and storage facilities. A municipality's expenses associated with keeping the accumulation of FOG minimal through the use of physical methods can be substantial. These costs, however, are preferable to having to clean (if possible) or replace sections of sewer that have become impassible to waste water due to the severe accumulation of insoluble waste. These blockages, which are often caused by FOG, can cause a sanitary sewer overflow (an "SSO"). An SSO is not only expensive to fix and clean itself, but in the event of an SSO, the US Environmental Protection Agency may issue substantial fines to the governing municipality. Additionally, if such an overflow contaminates the drinking water supply, the resulting public health emergency will require, at the least, the issuance of a boil order, where all affected people need to boil water before consuming it. In more extreme cases, boiling may be insufficient and clean water will need to be brought in, or the people moved out, until the water is again made drinkable.

Among the methods of mitigating FOG buildup are two common physical methods: hydro-jetting and pumping. Hydro-jetting essentially involves spraying the effluent facility (such as a sewer line) with high pressure water to break up any blockages. Generally, the hydro-jetting begins at the end of the blockage most distal to the originating drain and is directed upstream, towards the most proximal end of the blockage. In this manner, loosened material drains away from the blockage. A disadvantage to hydro-jetting is that no material is removed, it is simply broken up and washed more distal to the originating drain, where it may re-aggregate into another blockage further downstream. Accumulations in municipality controlled common sewer lines or effluent facilities can effect multiple buildings and multiple drains and create problems that are much more difficult and expensive to repair than a localized blockage.

Pumping is a much different solution to the problem of FOG buildup. In pumping, FOG is pumped from a point of accumulation and then otherwise disposed. The removed FOG may be, inter alia, recycled, converted into bio-diesel, enzymatically degraded, or placed into a landfill. The costs associated with pumping, transporting the recovered FOG, and disposing it can be substantial.

A different water contaminant is known as Biochemical oxygen demand ("BOD"). BOD is a procedure used to determine the amount of oxygen needed in a sample of water to allow aerobic bacteria to break down the organic material in said sample. It is often expressed as milligrams of oxygen consumed per liter of sample after a five day incubation at 20 degree Celsius, and is used as an indirect measurement of the organic pollution in water. In typical parlance, BOD is listed as a pollutant itself, such as in the U.S. Clean Water Act, although it is actually a measurement of organic contaminants. This typical usage is used in the application.

BOD includes all organic matter found in waste water. Fallen leaves and decaying plant material are the predominant natural sources of this organic matter, however the greatest sources of BOD, at least in developed area, can be traced to human impact. Runoff of nutrients from lawn fertilizers, grass clippings, paper, food scraps pushed down a disposal, and fecal matter, all contribute to the amount of organic material found in waste water. A sample's BOD directly relates to the amount of organic waste it contains, so lower BOD values indicate a lower amount of organic waste.

The potential for damage caused by the accumulation of FOG, as well as the additional processing required for waste water heavily polluted with FOG and BOD to ensure compliance with the Federal Clean Water Act and other relevant regulations, has caused municipalities to shift costs through the use of contaminant surcharges. For businesses such as food processing facilities that expel high FOG and BOD waste water, these contaminant surcharges can total in the tens of thousands a month.

Methods of using biological materials to reduce foodstuffs and FOG in waste water are known in the art.

Australian Patent AU739218B2 discloses a composition consisting of, inter alia, bacteria and free enzymes, that will digest macerated foodstuffs in a garbage disposal unit. This composition may also be used when macerated foodstuffs are in a drain line, proximal to the garbage disposal unit.

U.S. Pat. No. 6,187,193B1 discloses a method of decomposing FOG in a grease trap apparatus. The apparatus of the '193 patent holds drainage and stirs or splashes it via a rotating impeller or a sprinkler that sprinkles drainage onto the top of the held drainage pool. Aerobic bacteria are supplied to the drainage pool and the agitation caused by the spinning impeller or sprinkler supplies the bacteria with oxygen. Waste water processed by this apparatus are then expelled to a sewer system.

U.S. Pat. No. 7,338,692B1 discloses a method of reclaiming FOG from a grease trap using a recyclable solvent so that the FOG can be further processed or disposed.

U.S. Patent application 2008/0251451 A1 discloses a method and an apparatus for treating waste in which one or more reactor vessels accepts inputs of waste and of aerobic bacteria, an aeration means aerates the waste and supports the aerobic bacteria, and the treated waste water can be removed through an outlet means.

U.S. Pat. No. 6,325,934B1 discloses a granular substance comprising bacteria and enzymes in a heavy material that releases the bacteria and enzymes over a period of between a day and two weeks an water. The granular material is made heavy so that the particles sink into accumulated sludge in the bottom of a sewage digestion chamber, in this way minimizing dilution of the active ingredients in grey water above the sludge.

U.S. Pat. No. 6,706,518B2 discloses a method and apparatus for clearing FOG in which a dry agent comprising bacteria and enzymes is incubated to form an aqueous solvent capable of cleaning and clearing FOG. After production, this solvent is placed in contact with FOG to catalyze digestion of the FOG.

U.S. Pat. No. 5,464,766 discloses a powdered product consisting of, inter alia, enzymes and bacteria that can be delivered to a site containing organic waste in order to digest such waste.

These methods may be useful, but some require specialized, and perhaps also expensive equipment, while others are best suited for removal of accumulated waste products which may not be discovered until a drainage problem is discovered. Some would not reduce the pollution in the waste water entering a sewer or the contamination surcharges that may be imposed by a municipality.

SUMMARY

The subject matter of this application is a method to reduce organic waste, particularly fats, oils, and grease (FOG) in waste water. The disclosed methodology is also useful for catalyzing the degradation of any substance that can be used as a carbon source by wild-type or mutant bacteria. A wide range of pollutants can therefore be targeted by this methodology through the selection of bacterial strains, such selection being within the routine experimentation one in the microbiological arts would expect to encounter.

The method disclosed in this application involves a nutritive, gelatinous culture of vegetative, predominantly adult bacteria contained in a porous vessel such as a mesh bag which is at least partially submerged in a moving or still body of waste water. In a preferred embodiment, the porous vessel is tethered to a fixed or movable object so that it can be easily removed from the waste water. The pores of said porous vessel are sufficient in size to permit the passage of bacteria through the pores. As the gelatinous culture dissolves in the waste water, bacteria are released that bio-digest the organic waste found therein. The porous vessel affects the dissolution rate of the bacterial culture by reducing the flow of waste water through said vessel. In embodiments in which the porous container is tethered to an object, the gelatinous culture can be readily removed from the waste water at any time by retracting the porous vessel, although in most applications, the porous vessel will be left in the waste water after placement until the gelatinous culture has completely dissolved.

By providing vegetative, adult bacteria to the waste water, which continue to propagate in the waste water and digest said organic waste, the method substantially decreases the organic waste in the waste water in an environmentally sound manner. Further, the use of adult cultured bacteria means that the bacteria is able to digest organic waste shortly after being released into the waste water, without first needing to pass through a germination stage as may be required of methods using immature bacteria. Also, since the bio-activity associated with the bacterial culture does not depend on the use of free enzymes, which do not replicate, the bio-activity is sustained and may propagate as necessary to digest larger amounts of organic waste than would be possible with a similar sized mass of free enzymes. The porous vessel that contains the gelatinous culture may be easily recovered and can be recycled or disposed of in an appropriate manner.

BRIEF DESCRIPTION OF THE DRAWINGS

A complete understanding of the subject matter of this application may be obtained without reference to drawings, however, to ease such understanding of the subject matter, applicant provides two drawings.

DETAILED DESCRIPTION OF THE PREFERRED EMBODIMENT

Figure 1:
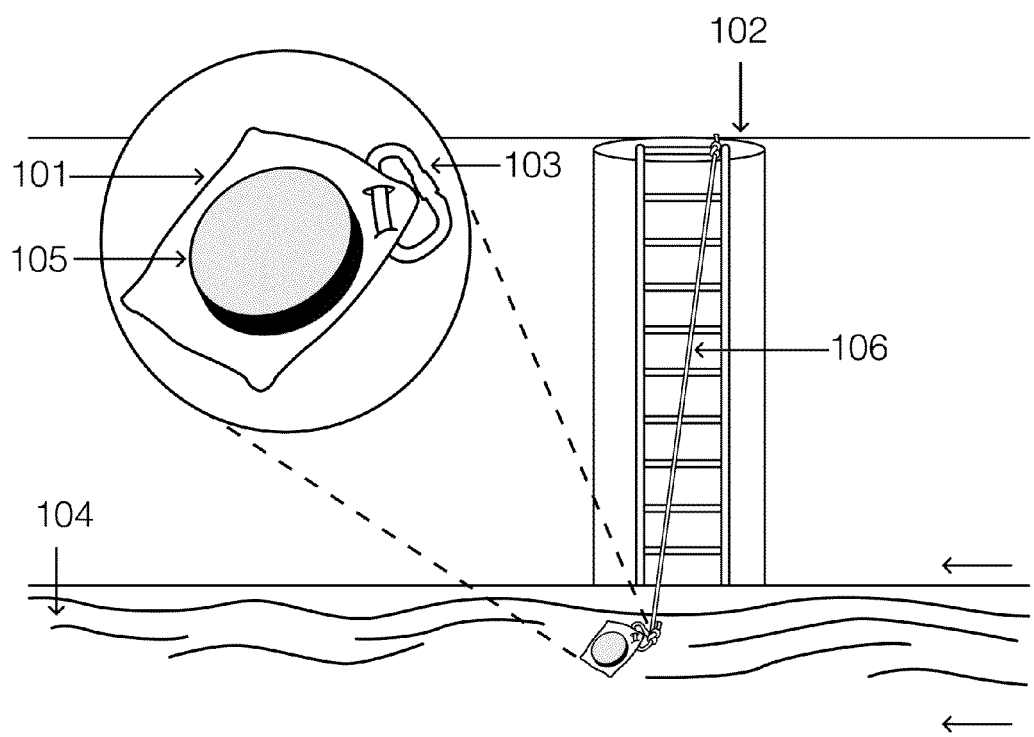
FIG. 1 is an illustrated chart showing a preferred embodiment of the disclosed method in use.

The following description and drawings referenced therein illustrate an embodiment of the application's subject matter. They are not intended to limit the scope. Those familiar with the art will recognize that other embodiments of the disclosed method are possible. All such alternative embodiments should be considered within the scope of the application's claims.

Each reference number consists of three digits. The first digit corresponds to the figure number in which that reference number is first shown. Reference numbers are not necessarily discussed in the order of their appearance in the figures.

This application discloses a method of treating waste water. Use of the method can reduce pollutants that can be digested by bacteria, particularly fats, oils and grease (FOG) and biochemical oxygen demand (BOD), (collectively "organic waste") in collection systems such as sewer lines, lift stations, treatment plants and similar such effluent transfer and storage facilities (collectively "effluent facilities")

A nutritive gelatinous mass suited for growing and supporting vegetative bacteria is formed from the gelling of a broth consisting of sodium chloride, sucrose, dried milk, seaweed agar, and microencapsulated D-limonene. The exact composition of the broth can be varied and customized as may be needed by one of skill in relevant arts, such as microbiology. The gelled mass may be inoculated with vegetative bacteria, such as those belonging to the genera *Bacillus, Saccharomyces*, and *Pseudomonas*, or such bacteria may comprise part of the broth. The resulting bacterial culture may gel, at least partially, in a porous vessel, or the culture may be fully gelled before it is placed within such a vessel. In one embodiment, the culture is held within a mesh bag [101]. In useful embodiments, the pores of the porous vessel must be large enough to allow bacteria to flow out as the gelatinous mass dissolves in waste water.

In a preferred embodiment, the porous vessel containing the gelatinous bacterial culture is tethered to a movable or a fixed object so that the vessel does not wash away and can be easily recovered. Most often, the vessel will not be removed until the bacterial culture has completely dissolved, although that does not have to be the case. In useful embodiments, the bacterial culture is in contact with waste water flowing, or standing, in an effluent facility, such as, e.g. a sewer line, lift station, or treatment plant. The waste water that enters through the pores of the porous vessel partially dissolves the bacterial culture, and passes out of the porous vessel, carrying with it some amount of the cultured bacteria.

In a preferred embodiment, the porous vessel is a mesh bag that is sealed around the gelatinous bacterial culture so that the culture is contained in the mesh bag as it is handled. In a most preferred embodiment, one end of a rope or chain [106] is reversibly of permanently attached to a fixed structure, such as a rung of a ladder found inside of an utility vault such as which may be accessed through a man hole or similar opening [102] and the other end of the rope is attached to a carabiner or D-ring [103], which is, in turn, connected to the culture-containing mesh bag [101]. The mesh bag, and thereby the bacterial culture, is lowered into the waste water [104]. The mesh bag containing the bacterial culture may be fully or partially submerged in the waste water, or it may float on top of the waste water depending upon the buoyancy of the mesh bag and bacterial culture, and on the specific gravity of the waste water. In this way, the bacterial culture [105] contacts the waste water passing through the pores of the mesh bag and the bacterial culture slowly dissolves in the waste water, gradually releasing the bacteria. The dissolution rate will vary based on factors such as the volume and rate of waste water passing through the effluent facility and may be altered by making changes to the composition of the gelatinous mass or to the pore size of the vessel.

Figure 2:
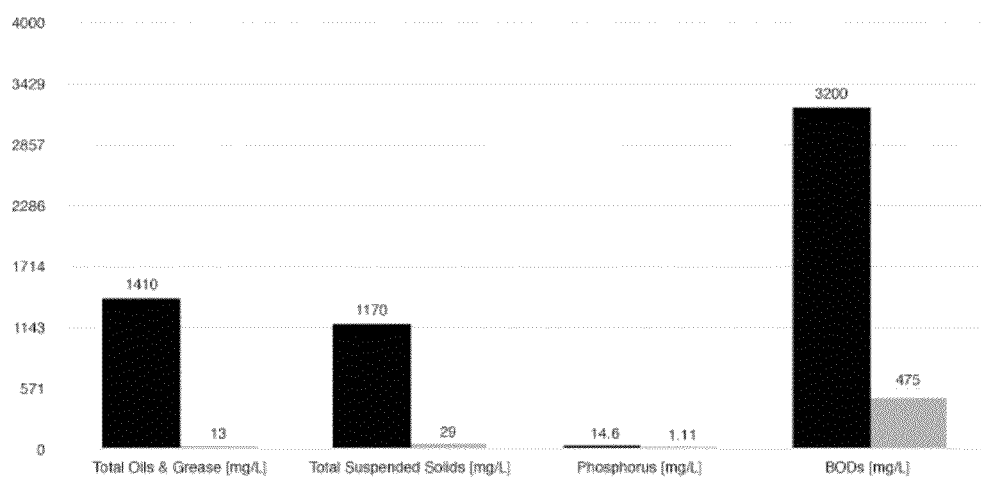
FIG. 2 is a graph summarizing the results of the use of the disclosed method in the treatment of the waste water from a food processing facility.

In one trial, results of which are summarized in FIG. 2, waste water leaving a food processing facility in the town of St. Mary in Ontario, Canada was treated with the method disclosed in this application. Prior to treatment, said facility was routinely expelling waste water with between 3,000 and 6,000 mg/L BOD and between 1,000 and 3,000 mg/L FOG and because of this high degree of contamination, was incurring surcharges from the town of St. Mary as high as $40,000 per month. Two mesh bags, such as those described, each containing approximately 250 ml of a nutritive gelatinous bacterial culture, also as described, and containing approximately 10^12 total bacteria, were lowered into the facility's sewer line so that the mesh bags, and therefore the bacterial culture contained in the bags, were in contact with the waste water as if flowed from the facility's drains. Completely, or almost completely, dissolved bacterial cultures were replaced during the treatment period. In FIG. 2, black columns illustrate pre-treatment values and grey columns illustrate values obtained after six months of treatment with the disclosed method.

To measure the contaminant reduction due to treatment with the disclosed method, samples were drawn from sampling stations in the sewer line downstream from the locations of the bacterial containing mesh bags.

Prior to the placement of the bacterial cultures, the waste water had been measured as containing 1410 mg/L FOD, 3200 mg/L BOD, 1170 mg/L total suspended solids, and 14.6 mg/L phosphorus. After six months of treatment with the disclosed method, measurements of the waste water indicated that all four measured quantities had been reduced so that the waste water contained 13 mg/L FOD, 475 mg/L BOD, 29 mg/L total suspended solids, and 1.11 mg/L phosphorus. Surcharges for excess contamination were completely eliminated.

Modifications and changes, readily apparent to those of routine skill in the relevant arts, can be made to the disclosed method without departing from the novel scope and spirit of the invention. The examples and embodiments given herein are to describe a manner or manners in which the disclosed method may be used, however they should not be considered to limit the scope of the claimed method.

I claim:

1. A method for treating waste water comprising placing a porous container that contains a nutritive gelatinous bacterial culture in contact with waste water
   a. said gelatinous bacterial culture comprising sodium chloride, sucrose, dried milk, seaweed agar, microencapulated D-limonene, and vegetative bacteria, and
   b. said vegetative bacteria comprises species from at least one of the genera *Bacillus, Saccharomyces*, or *Pseudomonas*.

2. A method for treating waste water comprising the steps of:
   a. Attaching a porous container that contains a nutritive gelatinous bacterial culture comprising sodium chloride, sucrose, dried milk, seaweed agar, microencapulated D-limonene, and vegetative bacteria comprising species from at least one of the genera *Bacillus, Saccharomyces*, or *Pseudomonas* to a tethering means, such tethering means having a first end and a second end, so that said tethering means said first end is reversibly attached to said porous container;
      i. said gelatinous bacterial culture comprising sodium chloride, sucrose, dried milk, seaweed agar, microencapulated D-limonene, and vegetative bacteria, and
      ii. said vegetative bacteria comprises species from at least one of the genera *Bacillus, Saccharomyces*, or *Pseudomonas;*
   b. attaching said second end of said tethering means to an object; and
   c. placing said porous container and said nutritive gelatinous bacterial culture in contact with waste water,
so, that said object attached to said second end of said tethering means anchors said porous container.

* * * * *